Dec. 18, 1956 A. P. WINTER 2,774,493
METHOD FOR UNLOADING VEHICLES
Filed Oct. 7, 1954
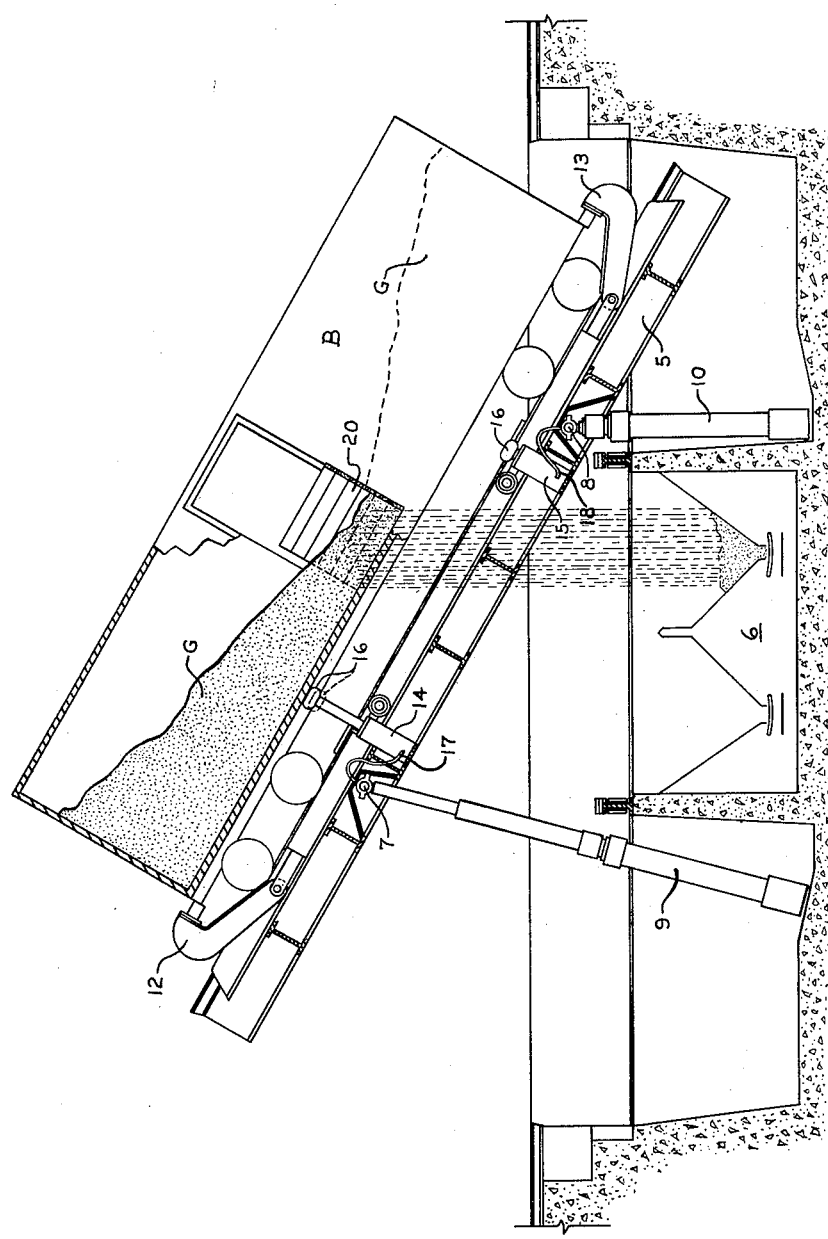
INVENTOR.
AUGUST P. WINTER
BY
ATTORNEY

United States Patent Office 2,774,493
Patented Dec. 18, 1956

2,774,493

METHOD FOR UNLOADING VEHICLES

August P. Winter, St. Vital, Manitoba, Canada

Application October 7, 1954, Serial No. 460,933

1 Claim. (Cl. 214—53)

This application is a continuation-in-part of my co-pending application Ser. No. 132,225, filed December 10, 1949, and now abandoned.

The present invention relates to an improved method for unloading granular materials, such as grain, from vehicles which are tilted to cause the grain to gravitate to and through an opening or openings in the vehicle body, which openings may be in the end or sides of the vehicle.

It has been proposed to unload grain-carrying railway box cars, by first tilting the cars sidewise and then alternately upending the cars to cause the grain to gravitate from the ends of the cars and out the side doorways. In some cases, instead of tilting the cars sideways, deflector boards are inserted in the side doorways to deflect the grain out the doorways as the cars are upended. In either case it has been found that the grain generally being dirty, damp, and frozen is often compacted, and does not move in the desired manner until the angle of the upended car is such that, once the grain begins to move, it plummets or cascades toward the opposite end of the car and the momentum carries a considerable quantity beyond the side doorways to the opposite end of the car. This necessitates repeated upending operations to clear the cars of the grain, all of which imposes wear and tear on the equipment. Another disadvantage of the method mentioned is that the steep angle of tilt in upending the cars is such that considerable overhead and pit clearances are necessary, and in many grain terminals these clearances are limited.

The principal object of the present invention is the provision of a method of promoting the gravitation of granular materials in vehicles so that the material can be made to flow at a relaitvely slow, steady rate when the cars are tilted endwise at an angle less than the normal angle of repose of the material involved. The invention contemplates impacting the floors of the vehicles from the underside and in an upward direction at frequent intervals to cause the material to separate from the floor and thereby reduce the friction thereof with the floor so that it flows upon a relatively slight tilting of the vehicles. Furthermore, the impacts are carried through the granular mass and shatters masses of the material whereby the material is rendered granular and relatively free flowing.

The invention further comprises the provision of apparatus for unloading vehicles including hydraulic means to upend a vehicle carrying cradle having hydraulically operated impactor means thereon for impacting the underside of the vehicle on the cradle in an upward direction, the impactor being supplied with hydraulic fluid by the exhaust of the cradle lifting rams.

Another object of the invention is to provide a tilting cradle structure for upending vehicles, such as railway box cars, thereon and having impactor means mounted thereto adapted to impact or strike the underside or floor of the car on the cradle with upward strokes so that the springs in the car trucks absorb the downward shocks of the impacted car body and cooperate with the impactor in lifting the loaded body during the upstroke of the impactor.

The invention enables railway cars to be unloaded of granular materials, particularly grains, with a minimum of upending elevation whereby the unloading apparatus may be installed and operated with less overhead and pit clearances than heretofore possible and the number of tilting operations is reduced to a minimum thereby saving considerable in installation costs, operating costs and accelerating unloading time. Furthermore, the relatively gradual and steady flow of grain minimizes or eliminates undue stresses and shocks in the railway cars and tilting mechanism.

Other objects and advantages of the invention will be apparent from the following description of a preferred form of the invention, reference being made to the accompanying drawing wherein a railway box car unloading structure embodying the invention and a box car of grain are shown schematically and partly in section.

While the invention may be employed for unloading different kinds of granular material from vehicles of various types, it is here shown and described in connection with the unloading of grain from railway box cars. Referring to the drawing, a cradle structure 5 is provided which extends crosswise over a grain receiving pit 6 the cradle being arranged to be tilted about either of two spaced pivots 7 and 8 by hydraulic rams 9, 10 which are operative alternatively to raise opposite ends of the cradle to upend a conventional box car B having the body spring supported on its trucks, the car being centered and locked on the cradle by clamping devices 12, 13. This cradle structure is described fully in my co-pending application Ser. No. 441,705 filed July 7, 1954, and the details, therefore, are not shown here.

The cradle has two hydraulically operated impactors 14 and 15 rigidly mounted thereon, each of which has an impactor ram 16 which is adapted to strike the underside of the floor of the car B when the impactors are supplied with hydraulic actuating fluid under pressure, as is well known in the art. These impactors may be of any suitable form and are available commercially. The hydraulic system for operating the impactors include the usual automatic valving for causing the rams 16 to reciprocate rapidly, striking the bottom of the car with sufficient force to cause the grain to be momentarily lifted from the floor due to the upward shock of the rams on the floor. Since the impactors and hydraulic systems therefor are available commercially and are well known in the art, the impactors are indicated generally and the hydraulic lines, valves, pumps, etc. are not shown other than lines 17, 18 leading from the exhaust of rams 9, 10 to the inlets of impactors 14, 15, respectively.

The impactors may be operated to produce any suitable frequency of impactions, and I have found that about 170 strokes per minute to be satisfactory.

In unloading grain from the railway car, the car is rolled onto the cradle and clamped thereon. The outer side doors are then opened and the coopering doors are forced inwardly and upwardly, or removed, if possible, and two deflectors 20 only one of which is shown, are inserted in the grain G at the center of the car and arranged in the form of a V so that the grain flowing from one end of the car is diverted sideways and out through the side doors.

One of the impactors, say 14 is operated and the adjacent ram 9 is simultaneously activated to cause the left hand or impacted end of the car to be slowly elevated. The action of the impactor causes the grain to be tossed from the floor and to break up lumps or compacted masses of the grain so that the mass of the grain is in granular form and commences to flow toward the center of the car before the angle of tilt of the car has reached the angle of repose of the grain. This is due to the reduction in friction of the grain with the floor and the individual kernels of grain so that the grain readily gravitates in the direction of the slight tilt. Thus, the grain may be caused to flow steadily and at a relatively slow rate, as contrasted with the cascading action heretofore encountered. Since the grain can be made to flow steadily its flow is regulatable by the rate of tilt of the car so that all of the grain in the half of the car which is raised will be deflected through the side doors and into the pits.

The action of the impactor in striking the bottom of the car results in the car springs reacting to the intermittent reduction and increases in loading and assisting in imparting vibratory movement to the car body in the direction of the impactor strokes.

After the left hand end of the car is emptied as described the ram 9 is then lowered to level the car. Preferably, as ram 9 is exhausted, the exhaust liquid is directed into the impactor 15 so that the latter may operate to break up compacted grain in the unloaded end of the car.

After the car is leveled, the deflectors 20 are reversed to form a V with the apex thereof extending toward the right. The impactor 15 is then activated along with the ram 10 so that the cradle is raised counterclockwise about the axle 7, and the grain is caused to flow to the deflectors and out into the pit, as described with reference to the first upending operation.

By the method shown and described, the flow of grain is such that all of the grain can be removed from the car by alternately upending opposite ends of the car but once and at a relatively small angle as compared with the degree of upending heretofore found to be necessary. This reduces the time of unloading to a minimum and conserves space and equipment in the installation of the unloaders over existing grain pits. Furthermore, shocks and strains are held to a minimum due to the gradual shifting and gravitation of the grain so that the equipment will give long and trouble-free service.

While I have described a preferred form of the invention it is to be understood that other forms, modifications and adaptations could be made within the scope of the claim below.

I claim:

The steps in a method of unloading granular material from a railway box car comprising upending the car by a hydraulic ram, lowering the upended car by exhausting the ram, and directing the exhaust of the ram to an impactor arranged to impact the lower end of the car by upward strokes on the bottom thereof.

References Cited in the file of this patent

UNITED STATES PATENTS

| | | |
|---|---|---|
| Re. 12,550 | Keefer | Oct. 30, 1906 |
| 840,248 | Pates | Jan. 1, 1907 |
| 1,542,951 | Perkins | June 23, 1925 |
| 1,851,502 | Ferris et al. | Mar. 29, 1932 |
| 2,507,749 | Bacheldor | May 16, 1950 |

FOREIGN PATENTS

| | | |
|---|---|---|
| 477,305 | Germany | June 5, 1929 |